(12) United States Patent
Okazaki et al.

(10) Patent No.: US 12,155,260 B2
(45) Date of Patent: Nov. 26, 2024

(54) CHARGING SYSTEM AND CHARGING METHOD

(71) Applicant: KUBOTA CORPORATION, Osaka (JP)

(72) Inventors: Kazuto Okazaki, Osaka (JP); Shunya Takase, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 22 days.

(21) Appl. No.: 18/135,849

(22) Filed: Apr. 18, 2023

(65) Prior Publication Data

US 2024/0055887 A1 Feb. 15, 2024

(30) Foreign Application Priority Data

Aug. 12, 2022 (JP) ................. 2022-128802

(51) Int. Cl.
*H02J 7/00* (2006.01)
*B60L 50/60* (2019.01)
*H02J 7/34* (2006.01)
*A01D 34/00* (2006.01)
*A01D 101/00* (2006.01)

(52) U.S. Cl.
CPC .............. *H02J 7/342* (2020.01); *B60L 50/60* (2019.02); *H02J 7/0013* (2013.01); *A01D 34/001* (2013.01); *A01D 2101/00* (2013.01); *B60L 2210/30* (2013.01); *H02J 2207/20* (2020.01)

(58) Field of Classification Search
CPC .. H02J 7/342; H02J 7/0013; H02J 7/00; H02J 2207/20; B60L 50/60; B60L 2210/30; A01D 34/00; A01D 34/001; A01D 2101/00
See application file for complete search history.

(56) References Cited

U.S. PATENT DOCUMENTS

2016/0288664 A1 10/2016 Biagini et al.

FOREIGN PATENT DOCUMENTS

| CA | 2929408 C | * | 5/2022 | .......... B60L 11/1844 |
|---|---|---|---|---|
| DE | 202022103449 U1 | | 6/2022 | |
| JP | 2021-957 A | | 1/2021 | |
| WO | 2022061241 A1 | | 3/2022 | |

OTHER PUBLICATIONS

European Search Report dated Dec. 22, 2023 in European family member application No. 23169074.4.

* cited by examiner

*Primary Examiner* — Robert L Deberadinis
(74) *Attorney, Agent, or Firm* — Greenblum & Bernstein, P.L.C.

(57) ABSTRACT

A charging system comprises: a first battery mountable in an electric work vehicle; a second battery mountable in an electric automobile; and a converter capable of conductively connecting to the first battery and the second battery, and also capable of converting first electric power from the second battery to second electric power receivable by the first battery and transmitting the second electric power to the first battery.

5 Claims, 4 Drawing Sheets

CHARGING SYSTEM AND CHARGING METHOD

CROSS REFERENCE TO RELATED APPLICATIONS

This application claims the benefit of priority to Japanese Patent Application No. 2022-128802 filed on Aug. 12, 2022. The entire contents of this application are hereby incorporated herein by reference.

BACKGROUND OF THE INVENTION

Field of the Invention

The present invention relates to a charging system and a charging method for charging an electric work vehicle that includes an electric drive mechanism and a battery for supplying driving power, the electric drive mechanism being capable of driving a vehicle to travel and driving a work device.

Description of the Related Art

For example, an electric tractor, which is an example of this type of electric work vehicle, is charged by an external power supply device connected to the vehicle via a connector after electric power of the battery has been consumed, as described in JP 2021-957A. For the charging, the electric work vehicle is moved to a location where the external power supply device is available, connected to the power supply device, and is then charged. The external power supply device is fixed at a predetermined location. To charge the electric work vehicle, the vehicle needs to be moved to the location where the external power supply device is installed and connected to the power supply device. For example, an electric work vehicle such as an electric tractor not only simply travels but may also perform ground work involving a large driving load in a field or the like. In this case, there is a concern that electric power will be excessively consumed, and charge amount of the battery will be consumed faster than expected by the user. The conventional configuration is disadvantageous in that troublesome work may be required, such as moving the electric work vehicle to the location where the external power supply device is available even if the battery charge becomes low during work.

SUMMARY OF THE INVENTION

A charging system of the present invention comprises:
a first battery mountable in an electric work vehicle;
a second battery mountable in an electric automobile; and
a converter configured to be conductively connected to the first battery and the second battery, and configured to convert first electric power from the second battery to second electric power receivable by the first battery and transmit the second electric power to the first battery,
wherein the first battery is charged with the second electric power.

According to the present invention, to charge the first battery mounted in the electric work vehicle, the converter is connected to the first battery mounted in the electric work vehicle and the second battery mounted in the electric automobile. The converter is able to convert the first electric power from the second battery to the second electric power and transmit the second electric power to the first battery. Even if, for example, the battery charge of the first battery of the electric work vehicle has become low in a field or the like, the electric automobile and the converter are moved to an area close to the electric work vehicle, and thereafter, the first battery of the electric work vehicle can be charged with use of the second battery mounted in the electric automobile. Accordingly, the first battery can be charged without any troublesome work by using electric power of the second battery mounted in the electric automobile, and the electric work vehicle need not be moved close to a power supply device that is fixed in place. The "converter" of the present invention may be capable of converting direct-current electric power to alternating-current electric power, or may be capable of converting alternating-current electric power to direct-current electric power, or may be capable of both.

In one preferred embodiment of the charging system of the present invention, the converter includes:
an electric power receiver configured to receive the first electric power from the second battery, the first electric power being direct-current power;
a first AC/DC converter configured to convert the first electric power to alternating-current electric power;
a transformer configured to transform a first voltage of the alternating-current electric power obtained by the first AC/DC converter to a second voltage receivable by the first battery;
a second AD/DC converter configured to convert the alternating-current electric power transformed by the transformer to the second electric power, the second electric power being direct-current power; and
an electric power transmitter configured to transmit the second electric power to the first battery.

According to this configuration, the converter converts the first electric power from the second battery that is received by the electric power receiver to alternating-current electric power with use of the first AC/DC converter. The transformer transforms the thus-converted alternating-current electric power to alternating-current electric power with the second voltage suitable for the first battery, and thereafter, the second AD/DC converter converts the transformed alternating-current electric power to direct-current electric power. The direct-current electric power is then transmitted from the electric power transmitter to the first battery. As a result, even if the voltage used by the second battery is different from the voltage used by the first battery, electric power can be converted to alternating-current electric power, which can easily be transformed, and then transformed to electric power with the second voltage suitable for the first battery, thereby enabling favorable charging processing.

In one preferred embodiment of the charging system of the present invention,
the converter is provided with a detector configured to detect a voltage of received electric power in response to receiving the first electric power, and
the transformer is capable of transforming the first voltage to the second voltage in correspondence with the voltage of received electric power detected by the detector.

According to this configuration, the detector automatically detects the voltage of the received electric power while the converter is connected to the second battery, and the transformer transforms the voltage of the received electric power to an appropriate voltage in correspondence with the detection result. As a result, it is possible to eliminate troublesome work, such as measuring, in advance, the voltage of the second battery mounted in the electric automobile and adjusting the operation of the transformer in accordance with the measured voltage, and the charging can be performed efficiently.

Features of a charging method according to the present invention lie in a charging method for charging a first battery mounted in an electric work vehicle, the method comprising:
  receiving, with use of a converter, first electric power from a second battery mounted in an electric automobile;
  converting, with use of the converter, the first electric power to second electric power receivable by the first battery; and
  charging the first battery with the second electric power.

According to this method, the converter receives the first electric power from the second battery mounted in the electric automobile, and converts the first electric power to the second electric power. Thereafter, the first battery can be charged with the second electric power. Accordingly, the first battery can be charged without any troublesome work by using electric power of the second battery mounted in the electric automobile, and the electric work vehicle need not be moved close to a power supply device that is fixed in place.

In one preferred embodiment of the charging method of the present invention,
  the converting includes:
    converting, with use of the converter, the first electric power to alternating-current electric power, the first electric power being direct-current power;
    transforming a first voltage of the alternating-current electric power to a second voltage receivable by the first battery; and
    converting the transformed alternating-current electric power to the second electric power, the second electric power being direct-current power.

According to this configuration, the first battery can be charged in a favorable state by converting the first electric power to alternating-current electric power, which can easily be transformed, transforming the first voltage of the alternating-current electric power to the second voltage receivable by the first battery, and then converting the transformed alternating-current electric power to the second electric power.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Modes for carrying out the present invention will be described with reference to the drawings. An "F" arrow, a "B" arrow, an "L" arrow, and an "R" arrow in the diagrams respectively indicate forward, backward, leftward, and rightward directions in the following description, unless otherwise stated. A "U" arrow and a "D" arrow in the diagrams indicate upward and downward directions, respectively.

Overall Configuration of Electric Tractor

Figure 1:
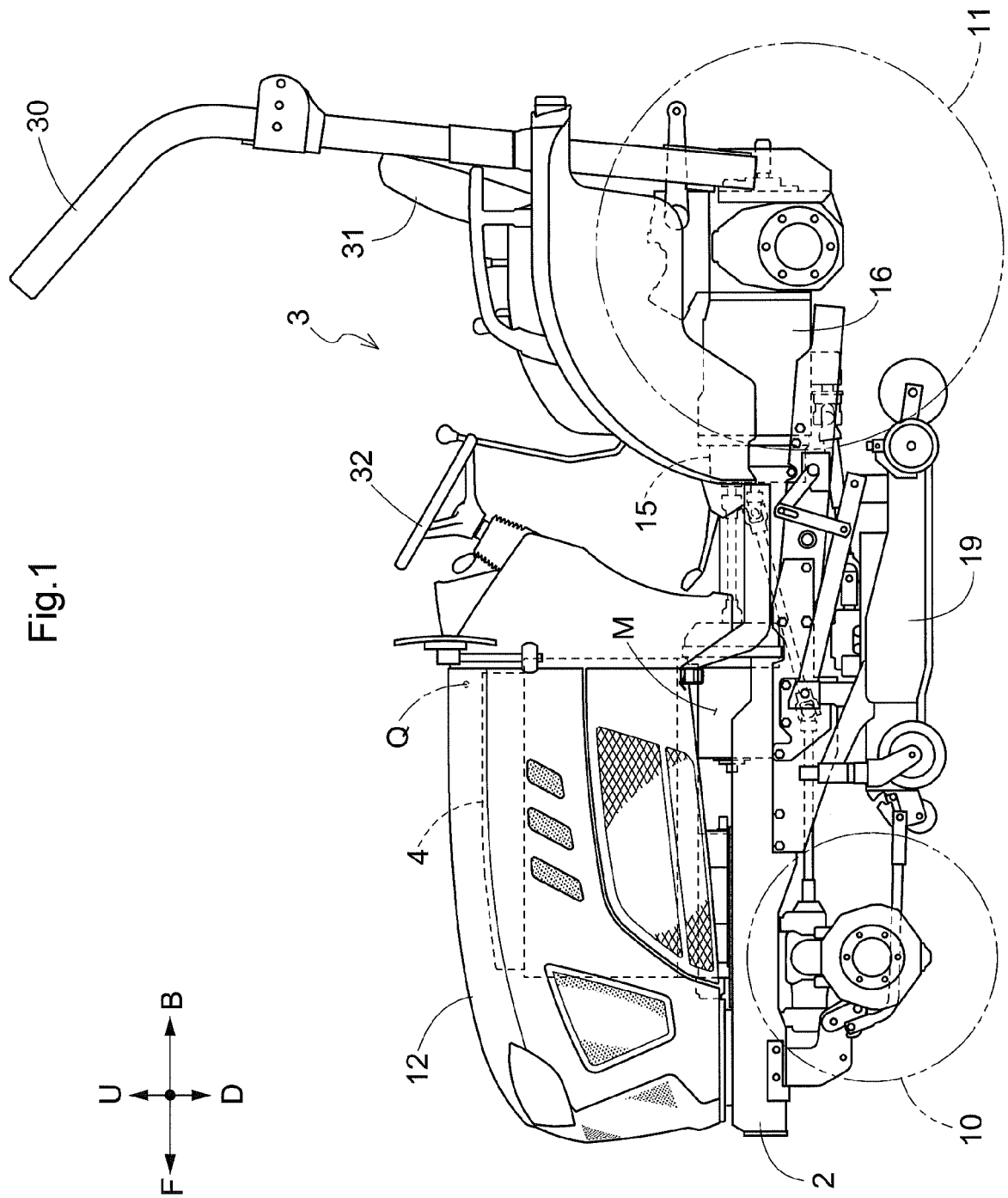
FIG. 1 is a left side view of an electric tractor.

An electric tractor 1 serving as an example of an electric work vehicle according to the present invention will be described below. The electric tractor 1 includes left and right front wheels 10 and left and right rear wheels 11, which serve as a body traveling device, and a cover member 12, as shown in FIG. 1.

The electric tractor 1 also includes a body frame 2 and an operator section 3. The left and right front wheels 10 and the left and right rear wheels 11 support the body frame 2.

The cover member 12 is in a front part of the body. The operator section 3 is rearward of the cover member 12. In other words, the cover member 12 is forward of the operator section 3.

The operator section 3 has a protective frame 30, an operator seat 31, and a steering wheel 32. An operator can sit on the operator seat 31. The operator can thus board the operator section 3. The left and right front wheels 10 are steered by operating the steering wheel 32. The operator can perform various driving operations in the operator section 3.

The electric tractor 1 includes a traveling battery 4 (an example of a first battery). The cover member 12 is able to pivot about an opening-closing axis Q, which extends parallel to the left-right direction of the body. The cover member 12 is thus openable and closable. The traveling battery 4 is covered by the cover member 12 while the cover member 12 is closed.

Figure 2:
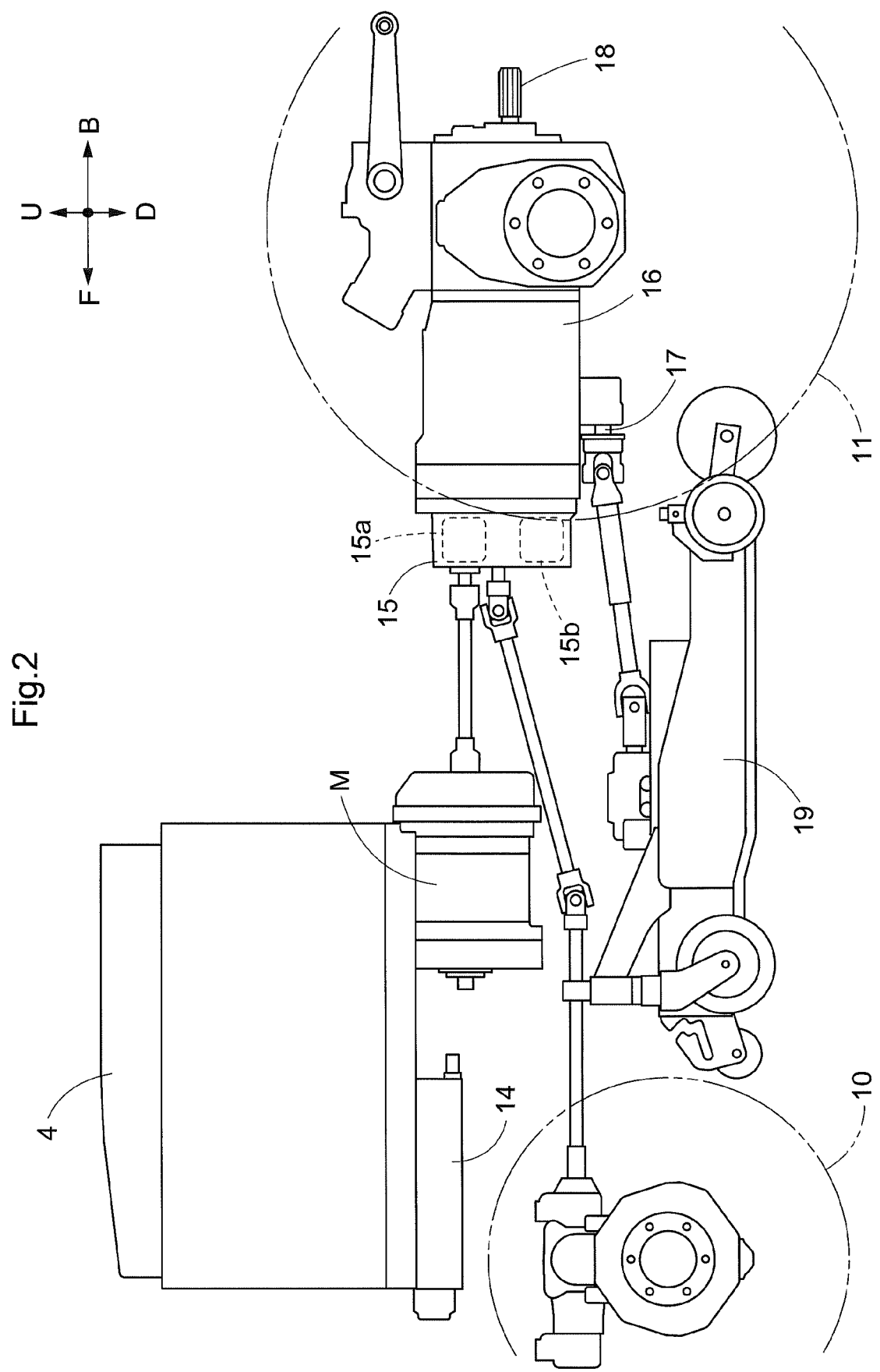
FIG. 2 is a left side view showing the placement of an inverter and other members.

The electric tractor 1 also includes an inverter 14 and an electric motor M, as shown in FIG. 2. The traveling battery 4 supplies electric power to the inverter 14. The inverter 14 converts direct-current electric power from the traveling battery 4 to alternating-current electric power and supplies the resultant alternating-current electric power to the electric motor M. The alternating-current electric power supplied from the inverter 14 drives the electric motor M.

Figure 3:
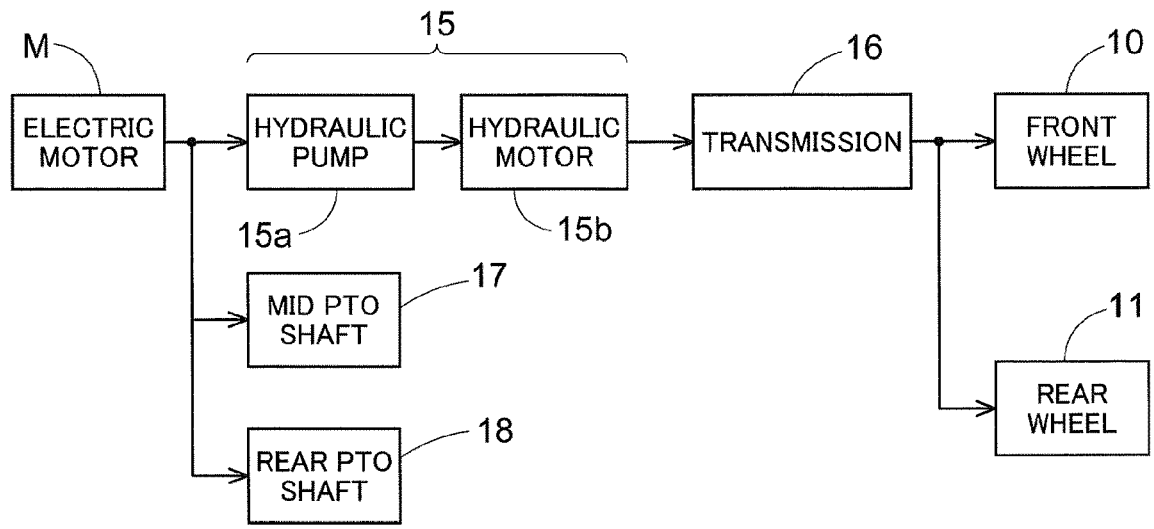
FIG. 3 shows a flow of motive power transfer.

The electric tractor 1 also includes a hydrostatic continuously variable transmission 15 and a transmission 16, as shown in FIGS. 2 and 3. The hydrostatic continuously variable transmission 15 has a hydraulic pump 15a and a hydraulic motor 15b, as shown in FIG. 3.

Rotational power from the electric motor M drives the hydraulic pump 15a. Rotational power is output from the hydraulic motor 15b in response to driving of the hydraulic pump 15a. Note that the hydrostatic continuously variable transmission 15 is configured in such a manner that the rotational power is subjected to speed change between the hydraulic pump 15a and the hydraulic motor 15b. The gear ratio of the hydrostatic continuously variable transmission 15 can be changed steplessly.

Rotational power output from the hydraulic motor 15b is transferred to the transmission 16. Rotational power transferred to the transmission 16 is subjected to speed change by a gear-type speed change mechanism of the transmission 16, and is distributed to the left and right front wheels 10 and the left and right rear wheels 11. This drives the left and right front wheels 10 and the left and right rear wheels 11.

The electric tractor 1 also includes a mid PTO shaft 17 and a rear PTO shaft 18 that serve as power take-off shafts, as shown in FIGS. 2 and 3. Rotational power output from the electric motor M is distributed to the hydraulic pump 15a, the mid PTO shaft 17, and the rear PTO shaft 18. This rotates the mid PTO shaft 17 and the rear PTO shaft 18.

Rotational power of the mid PTO shaft 17 or the rear PTO shaft 18 drives a work device, which is an external device, if the work device is connected to the mid PTO shaft 17 or the rear PTO shaft 18. For example, a mowing device 19 is connected to the mid PTO shaft 17 in this embodiment, as shown in FIG. 2. Rotational power of the mid PTO shaft 17 drives the mowing device 19.

Configuration Related to Motor Control

Figure 4:
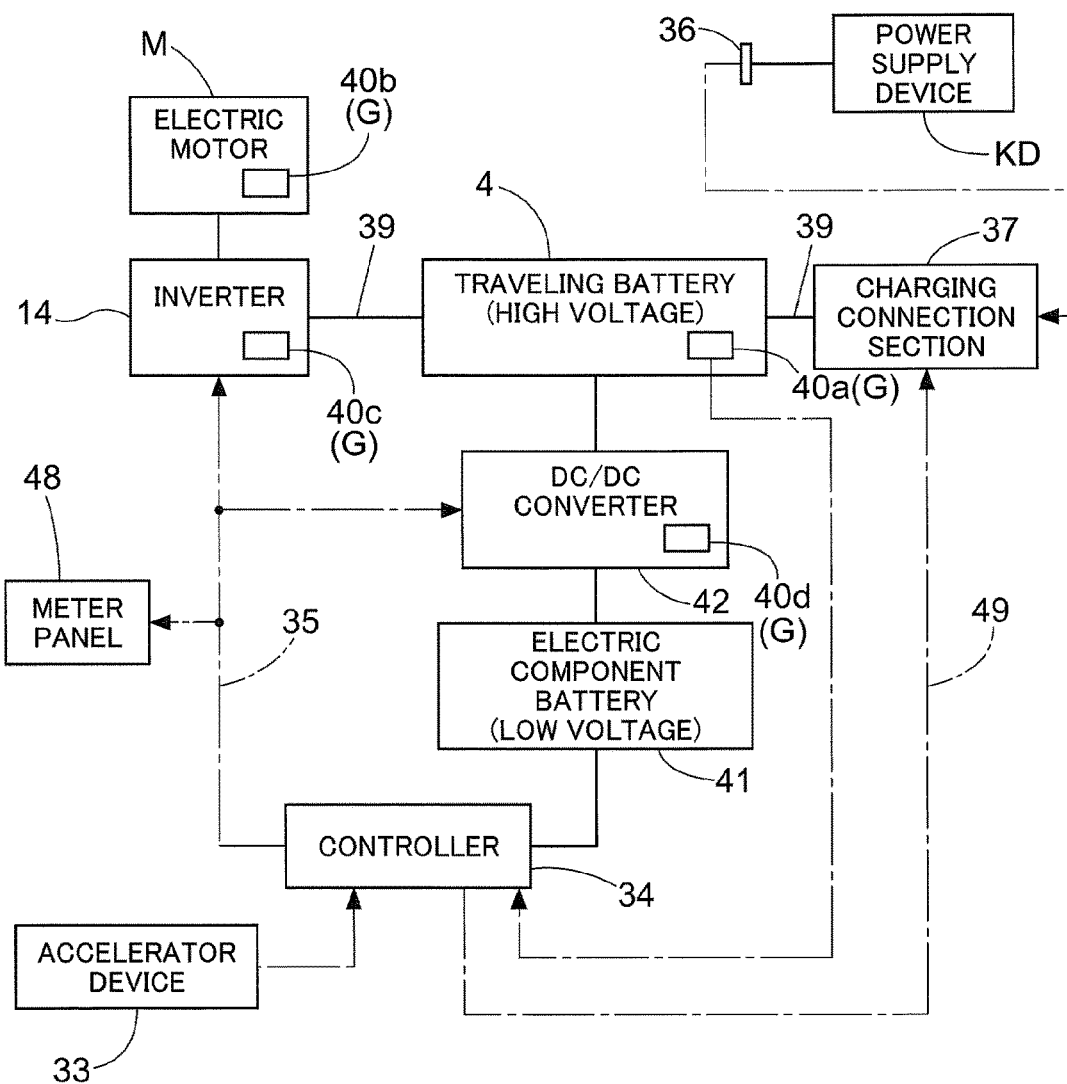
FIG. 4 is a block diagram showing a charging configuration.

A configuration related to control of the electric motor M includes an accelerator device 33, a controller 34 for controlling operation of the electric motor M, and the inverter 14, as shown in FIG. 4. The accelerator device 33 is near the steering wheel 32. Although not shown in FIG. 4, The accelerator device 33 includes a pivotable lever, and a potentiometer that is operated by pivoting the lever. The accelerator device 33 is connected to the controller 34. The controller 34 is connected to the inverter 14 via a signal harness 35. The controller 34 gives the inverter 14 a command in accordance with a command from the accelerator device 33. The inverter 14 adjusts electric power supplied from the traveling battery 4 to the electric motor M and controls the output of the electric motor M in accordance with the command from the controller 34.

Configuration Related to Charging—1

The traveling battery 4 can be charged by an external power supply device KD, as shown in FIG. 4. This power supply device is installed in advance at a fixed position in a predetermined location, and the electric tractor 1 needs to be moved to the location where the power supply device is installed in order to be charged.

The electric tractor 1 includes a charging connection section 37 to which a power supply connector 36 of the power supply device KD is connectable. The charging connection section 37 is provided within the cover member 12 and exposed to the outside in response to the cover member 12 being pivoted to open. The controller 34 controls the operation of the electric motor M and controls the charging state of the power supply device KD.

The charging connection section 37 conforms to a regularly used common standard (CHAdeMO standard, CCS standard etc.). The traveling battery 4 is charged via a power supply line 39 with the power supply connector 36 connected to the charging connection section 37. The traveling battery 4 supplies high-voltage (e.g., tens to hundreds of volts) electric power to the inverter 14 and the electric motor M via power supply lines 39.

The electric tractor 1 also includes an electric component battery 41 for supplying electric power to the controller 34 and other electric components, in addition to the traveling battery 4. The electric component battery 41 supplies low-volt (12-volt) electric power to drive the electric components. The electric component battery 41 is charged with electric power supplied from the traveling battery 4 via a DC/DC converter 42. An operation panel 43 includes a meter panel 48 for displaying, for example, the traveling state and working state of the body, and battery information (battery charge, temperature). The meter panel 48 is connected to the controller 34 which controls operation of the meter panel 48.

The controller 34, the inverter 14, the traveling battery 4, the DC/DC converter 42, the meter panel 48, the charging connection section 37, and other similar members are connected to each other via the signal harness 35 of a CAN (Controller Area Network) type in such a manner that data can be communicated therebetween. The controller 34 is able to communicate signals with the power supply device KD via a charging communication harness 49 and the charging connection section 37.

The controller 34 switches to a charging mode in response to being operable with the power supply connector 36 connected to the charging connection section 37. In the charging mode, the traveling battery 4 is charged by the power supply device KD.

Configuration Related to Charging—2

The electric tractor 1 can be charged not only by the power supply device KD but also with electric power from a battery 51 (an example of a second battery) mounted in an electric automobile 50, which is a commonly used passenger car.

Figure 5:
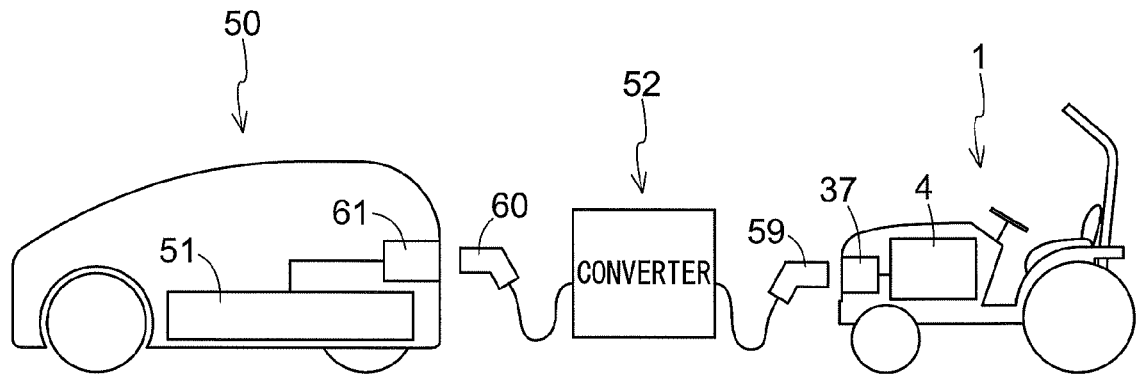
FIG. 5 shows a charging system.

FIG. 5 shows a charging system for charging the traveling battery 4 (hereinafter, "first battery") of the electric tractor 1 with use of the battery 51 (hereinafter, "second battery") mounted in the electric automobile 50.

The charging system includes the first battery 4 mounted in the electric tractor 1, the second battery 51 mounted in the electric automobile 50, and a converter 52 capable of being conductively connected to the first battery 4 and the second battery 51, and also capable of converting first electric power from the second battery 51 to second electric power receivable by the first battery 4 and transmitting the second electric power to the first battery 4. The first battery 4 can be charged with the second electric power.

Figure 6:
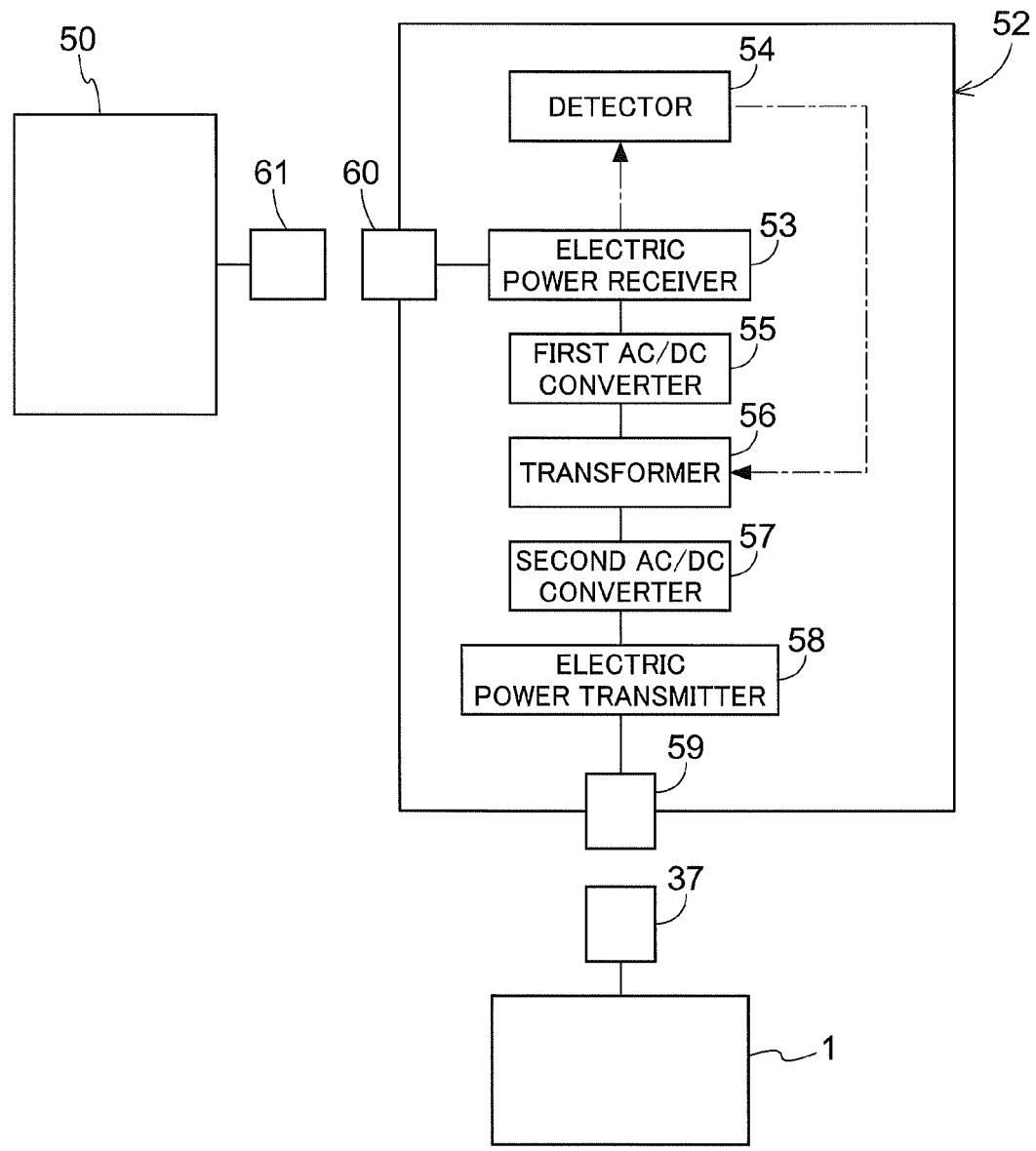
FIG. 6 is a block diagram of a converter.

The converter 52 includes an electric power receiver 53 for receiving the first electric power, which is direct-current electric power, from the second battery 51, a detector 54 for detecting the voltage of the received electric power in response to receiving the first electric power from the second battery 51, a first AC/DC converter 55 for converting the first electric power to alternating-current electric power, a transformer 56 that transforms the voltage (first voltage) of the alternating-current electric power obtained by the first AC/DC converter 55 to a voltage (second voltage) receivable by the first battery 4, a second AD/DC converter 57 that converts the alternating-current electric power transformed by the transformer 56 to second electric power that is direct-current electric power, and an electric power transmitter 58 that transmits the second electric power to the first battery 4, as shown in FIG. 6. The transformer 56 is capable of transforming the first voltage to the second voltage receivable by the first battery 4, in correspondence with the voltage of the received electric power detected by the detector 54.

The converter 52 includes a first power supply connector 59, which is similar to the power supply connector 36 of the power supply device KD, and is connectable to the charging connection section 37 of the electric tractor 1. The converter 52 includes a second power supply connector 60 for an electric automobile that has a configuration similar to the power supply connector 36 of the electric tractor 1, and the electric automobile 50 includes a charging connection section 61 to which the second power supply connector 60 is connectable. The charging connection section 61 conforms to a regularly used common standard.

For charging with use of this charging system, the electric tractor 1, the electric automobile 50, and the converter 52 are positioned close to each other in such a manner as to be connectable to each other. The first power supply connector 59 of the converter 52 is connected to the charging connection section 37 of the electric tractor 1, and the second power supply connector 60 of the converter 52 is connected to the charging connection section 61 of the electric automobile 50.

The electric power receiver 53 of the converter 52 receives the first electric power from the second battery 51 mounted in the electric automobile 50, and the first AC/DC converter 55 converts the first electric power to alternating-current electric power. The transformer 56 transforms the voltage (first voltage) of the alternating-current electric power to a voltage (second voltage) receivable by the first battery 4, and the second AD/DC converter 57 converts the transformed alternating-current electric power to the second electric power that is direct-current power. Here, the transformer 56 automatically transforms the first voltage to the second voltage in accordance with the voltage of the first electric power detected by the detector 54. The converted second electric power is supplied to the first battery 4 of the electric tractor 1 via the electric power transmitter 58 and the first power supply connector 59, thus charging the first battery 4.

The converter 52 can be loaded onto a transport truck, for example, and moved to any location. The electric automobile 50 can also be moved to any location. Accordingly, even if the battery charge has decreased while the electric tractor 1 is working in a field, the electric tractor 1 can be charged by moving the electric automobile 50 and the converter 52 to the location where the electric tractor 1 is.

OTHER EMBODIMENTS (1) The converter 52 of the above embodiment includes the first AC/DC converter 55, the transformer 56, and the second AD/DC converter 57, and converts direct-current electric power to alternating-current electric power and changes the voltage value. Instead of this type of configuration, a direct-current voltage converter may be employed that is capable of directly converting direct-current electric power to direct-current electric power with a different voltage value.

(2) The converter 52 of the above embodiment is provided with the detector 54. The transformer 56 is able to transform the first voltage of electric power to the second voltage receivable by the first battery 4, in correspondence with the detected received electric power. Instead of this type of configuration, an alternative configuration may be employed in which an electric automobile 50 is used that has a second battery 51 whose voltage value is known in advance, and the transformer ratio of the transformer 56 is always constant.

(3) The above embodiment has described the electric tractor 1. However, the present invention is applicable to not only electric tractors but also various other electric work vehicles, such as electric combines and electric rice transplanters.

Note that the configuration disclosed in the above embodiment (including other embodiments; the same applies to the following) can be combined with configurations disclosed in other embodiments as long as no contradiction arises. The embodiment disclosed herein is an example, and embodiments of the present invention are not limited thereto. The present invention can be modified as appropriate without departing from the objects of the present invention.

The present invention is applicable to a charging system for charging an electric work vehicle that includes an electric drive mechanism capable of driving the body to travel and driving a work device, and a battery for supplying driving electric power.

While preferred embodiments of the present invention have been described above, it is to be understood that variations and modifications will be apparent to those skilled in the art without departing from the scope and spirit of the present invention. The scope of the present invention, therefore, is to be determined solely by the following claims

What is claimed is:

1. A charging system comprising:
a first battery mountable in an electric work vehicle;
an electric motor mounted in the electric work vehicle and driven by an electric power from the first battery;
a power take-off shaft mounted in the electric work vehicle and driven by a motive power from the electric motor;
a work device connected to the power take-off shaft to be driven by the motive power from the electric motor;
a second battery mountable in an electric automobile; and
a converter configured to be conductively connected to the first battery and the second battery, and configured to convert first electric power from the second battery to second electric power receivable by the first battery and transmit the second electric power to the first battery,
wherein the first battery is charged with the second electric power.

2. The charging system according to claim 1, wherein the converter includes:
an electric power receiver configured to receive the first electric power from the second battery, the first electric power being direct-current power;
a first AC/DC converter configured to convert the first electric power to alternating-current electric power;
a transformer configured to transform a first voltage of the alternating-current electric power obtained by the first AC/DC converter to a second voltage receivable by the first battery;
a second AD/DC converter configured to convert the alternating-current electric power transformed by the transformer to the second electric power, the second electric power being direct-current power; and
an electric power transmitter configured to transmit the second electric power to the first battery.

3. The charging system according to claim 2, wherein the converter is provided with a detector configured to detect a voltage of received electric power in response to receiving the first electric power, and
the transformer is capable of transforming the first voltage to the second voltage in correspondence with the voltage of received electric power detected by the detector.

4. A charging method for charging a first battery mounted in an electric work vehicle including an electric motor driven by an electric power from the first battery and a power take-off shaft driven by a motive power from the electric motor which power take-off shaft being connectable with a work device, the method comprising:
receiving, with use of a converter, first electric power from a second battery mounted in an electric automobile;
converting, with use of the converter, the first electric power to second electric power receivable by the first battery; and
charging the first battery with the second electric power.

5. The charging method according to claim 4, wherein the converting includes:
converting, with use of the converter, the first electric power to alternating-current electric power, the first electric power being direct-current power;
transforming a first voltage of the alternating-current electric power to a second voltage receivable by the first battery; and converting the transformed alternating-current electric power to the second electric power, the second electric power being direct-current power.

\* \* \* \* \*